(12) United States Patent
Schodrowski et al.

(10) Patent No.: US 7,845,474 B2
(45) Date of Patent: Dec. 7, 2010

(54) COMBINED SERVICE BRAKE AND SPRING TYPE BRAKE CYLINDER HAVING INTERNAL VENTILATION

(75) Inventors: Antony Schodrowski, Lisieux (FR); Sebastian Le Mer, Auquainville (FR)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 11/990,947

(22) PCT Filed: Jul. 27, 2006

(86) PCT No.: PCT/EP2006/007438

§ 371 (c)(1),
(2), (4) Date: Sep. 16, 2009

(87) PCT Pub. No.: WO2007/012489

PCT Pub. Date: Feb. 1, 2007

(65) Prior Publication Data

US 2010/0007201 A1   Jan. 14, 2010

(30) Foreign Application Priority Data

Jul. 27, 2005   (DE) .................... 10 2005 035 787

(51) Int. Cl.
  *B60T 11/10*   (2006.01)
(52) U.S. Cl. ...................... 188/153 D; 92/63
(58) Field of Classification Search ............ 188/153 D, 188/153 R, 170; 303/7, 9.76; 92/48, 62, 92/63, 78, 82, 130
See application file for complete search history.

(56) References Cited

U.S. PATENT DOCUMENTS 3,736,842 A * 6/1973 Valentine ..................... 91/1

(Continued)

FOREIGN PATENT DOCUMENTS

DE   40 11 739 A1   10/1991

(Continued)

OTHER PUBLICATIONS

International Search Report dated Oct. 2, 2006 including English translation (Six (6) pages).

(Continued)

*Primary Examiner*—Christopher P Schwartz
(74) *Attorney, Agent, or Firm*—Crowell & Moring LLP

(57) ABSTRACT

A combined service brake and spring brake cylinder has a diaphragm arranged in a housing of the service brake cylinder. At one side, the diaphragm delimits a service brake chamber acted on with a service brake pressure, and at the other side delimits a chamber accommodating a return spring. A spring brake piston is arranged in a housing of the spring brake cylinder, which at one side delimits a spring brake chamber and at the other side delimits a spring chamber. A piston rod supports a ventilation valve which produces or blocks a flow connection between the spring chamber and the service brake chamber. The ventilation valve includes a piston interacting with a valve seat. At least one further piston interacts with a further valve seat and opens at least one further flow cross-section when in its position raised from the further valve seat. When the parking brake is applied and the service brake is simultaneously actuated with service brake pressures lower than a pressure threshold, one piston is raised from the valve seat and the further piston is sealed against the further valve seat.

10 Claims, 5 Drawing Sheets

U.S. PATENT DOCUMENTS

| | | | | |
|---|---|---|---|---|
| 5,722,311 | A | * | 3/1998 | Pierce et al. .................. 92/63 |
| 7,513,341 | B2 | * | 4/2009 | Lachermeier ............... 188/170 |
| 2009/0134697 | A1 | * | 5/2009 | Savagner et al. ............. 303/87 |

FOREIGN PATENT DOCUMENTS

| | | |
|---|---|---|
| EP | 0 020 862 A1 | 1/1981 |
| EP | 0 025 558 A1 | 3/1981 |
| EP | 0 279 930 A1 | 8/1988 |
| EP | 0 554 050 A1 | 8/1993 |
| GB | 1 237 641 | 6/1971 |

OTHER PUBLICATIONS

International Preliminary Report with English translation (Fifteen (15) pages).

* cited by examiner

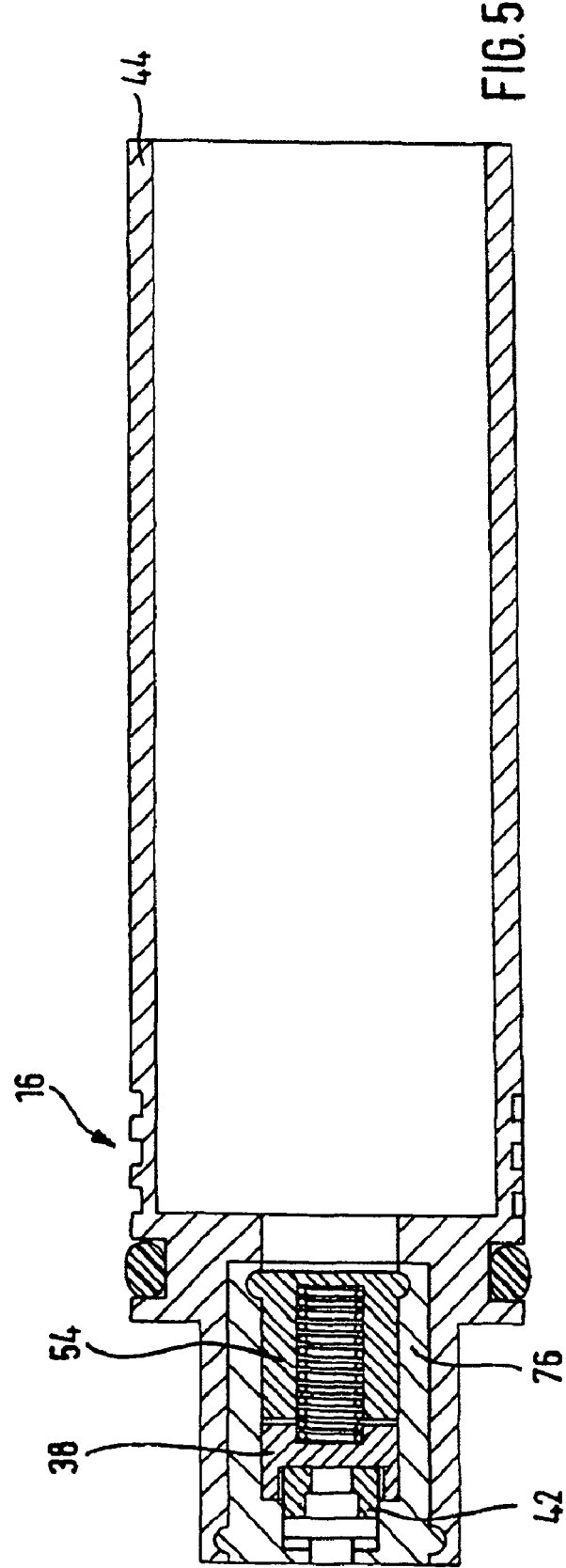

COMBINED SERVICE BRAKE AND SPRING TYPE BRAKE CYLINDER HAVING INTERNAL VENTILATION

BACKGROUND AND SUMMARY OF THE INVENTION

The invention is directed to a combined service brake and spring type brake cylinder having a diaphragm, which may be impinged with pressure, situated in a housing of the service brake cylinder, which delimits a service brake chamber, which may be impinged with a service brake pressure, on one side and a chamber receiving a return spring on the other side. A spring type brake piston, which is situated in a housing of the spring type brake cylinder and is actuatable by a storage spring, delimits a spring type brake chamber on one side and a spring chamber, which receives a storage spring, on the other side, and has a piston rod, which carries a ventilation valve that produces or blocks a flow connection between the spring chamber and the service brake chamber. The ventilation valve contains a piston working together with a valve seat, which is loaded by the pressure in the spring chamber in the open position and releases a flow cross-section in its position lifted off of the valve seat.

Such a combined service brake and spring type brake cylinder is known, for example, from DE 40 11 739 A1. The ventilation valve is situated therein on its end in the hollow piston tube of the spring type brake piston, which may project into the service brake chamber as a function of the operating state. The ventilation valve has the object, upon disengagement of the parking brake, of dissipating the overpressure arising due to the return of the parking brake piston and thus the decreasing volume of the spring chamber, in that it is switched thereby into its open position and produces a flow connection between the spring chamber and the service brake chamber. When starting on a level roadway, the service brake chamber is ventilated and is connected to a ventilator of a pressure regulator module, because service braking is not necessary after the parking brake is disengaged. At least a part of the excess air volume in the spring chamber may then flow out, which thus does not reach the atmosphere directly therefrom, e.g., via a valve situated in the wall of the spring chamber, but rather via the aeration and ventilation path of the service brake chamber. Therefore, one also refers to internal ventilation in this context.

However, when starting on a rising roadway, it is necessary to at least briefly additionally apply the service brake after or during the disengagement of the parking brake to prevent the vehicle from rolling backward. In this case, the service brake chamber is aerated. In the event of sufficiently high brake demand by the driver, the service brake pressure existing in the service brake chamber and also on one side of the piston may be capable of keeping it closed against the effect of the pressure building up in the spring chamber on the valve seat and thus the ventilation valve. However, if the service brake pressure and/or the service brake pressure gradient are below certain threshold values because of a correspondingly low service brake demand of the driver, the service brake pressure existing on one side of the piston is insufficient to keep the ventilation valve closed. Compressed air then flows from the service brake chamber via the open ventilation valve into the spring chamber. It escapes from there via the piston seal and the housing seal into the atmosphere, which on one hand causes disturbing noises. On the other hand, the air volume flowing out via the ventilation valve is no longer available for dissipating the service brake force.

The present invention is based on the object of refining a combined service brake and spring type brake cylinder of the type cited at the beginning in such a way that the above-mentioned disadvantages are avoided.

The invention is based on the idea that the ventilation valve contains at least one further piston, which works together with a further valve seat and is loaded by the pressure in the spring chamber in the open position and by the pressure in the service brake chamber in the closed position, which releases at least one further flow cross-section in its position lifted off of the further valve seat, the one piston being lifted off of the valve seat and the further piston being sealed against the further valve seat when the parking brake is applied and the service brake is actuated simultaneously using service brake pressures which are less than a pressure threshold, and/or using service brake pressure gradients which are less than a pressure gradient threshold. Because of the smaller flow cross-section, the volume flow or the air volume, which flows out from the service brake chamber via the partially open ventilation valve into the spring chamber and therefrom via the seals to the outside, is less than in the prior art, which has an advantageous effect on the noise behavior and the air consumption.

Advantageous refinements and improvements of the invention specified in the independent claims are described herein.

More detailed information is disclosed in the following description of exemplary embodiments.

BRIEF DESCRIPTION OF THE DRAWINGS

In the following, exemplary embodiments of the invention are illustrated in the drawings and explained in greater detail in the following description. In the drawings

FIG. 5 shows a cross-sectional illustration of a further embodiment of a ventilation valve.

DETAILED DESCRIPTION OF THE DRAWINGS

Figure 1:
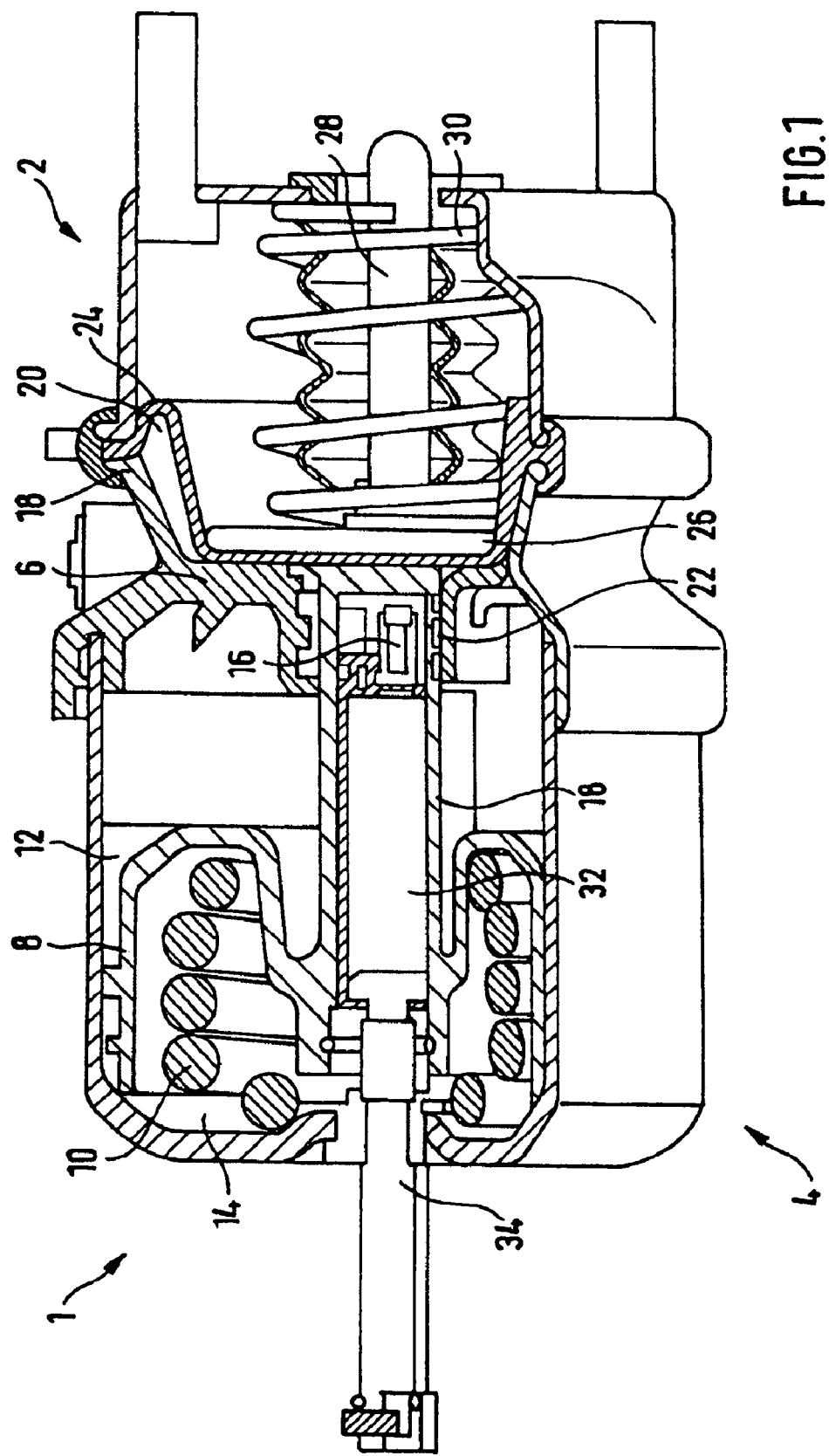
FIG. 1 shows a sectional illustration of a combined service brake and spring type brake cylinder according to a preferred embodiment of the invention.

For the exemplary explanation of the invention, a combined service brake and spring type brake cylinder 1, referred to in the following as a combined cylinder, is illustrated in FIG. 1. The combined cylinder includes a service brake cylinder 2 and a spring type brake cylinder 4, which is connected thereto functionally and in its construction. The service brake cylinder 2 and the spring type brake cylinder 4 are separated from one another by an intermediate wall 6. A spring type brake piston 8 is situated so it is displaceable inside the spring type brake cylinder 4, a storage spring 10 pressing against one side of the spring type brake piston 8. The storage spring 10 is supported on its opposite side on the floor of the spring type brake cylinder 4. A spring type brake chamber 12 is implemented between the spring type brake piston 8 and the intermediate wall 6, which is connected to a pressure regulator module (not shown for reasons of scale), to aerate and ventilate this module. Upon aeration, the spring type brake piston 8 is displaced axially in the disengaged position of the parking brake under tension of the storage spring 10. During this displacement of the spring type brake piston 8, the air which is provided inside the spring chamber 14 accommodating the storage spring 10 is pressed out via a ventilation valve 16. In contrast, if the spring type brake chamber 12 is ventilated for the purpose of braking, the storage spring 10 is then capable of displacing the spring type brake piston 8 into the applied position.

The spring type brake piston 8 is connected to a hollow piston rod 18, which extends through the intermediate wall 6 into a service brake chamber 20 of the service brake cylinder 2. A seal 22 inset in the intermediate wall 6 forms a seal in relation to the external wall of the piston rod 18 during its longitudinal movement. An intake opens into the service brake chamber 20, via which compressed air may be introduced and discharged to actuate the service brake cylinder 2. The compressed air acts on a diaphragm 24 inserted inside the service brake cylinder 2, on whose opposite side a pressure part is provided in the form of a diaphragm plate 26. The diaphragm plate 26 is connected to a pressure rod 28, which works together with a brake actuating mechanism outside the combined cylinder 1. This mechanism may be actuating elements of a disk brake of a motor vehicle, for example. The service brake cylinder 2 is an active brake cylinder, i.e., the service brake is applied by aerating the service brake chamber 20 and disengaged by ventilation. A return spring 30, which is supported on one side on the diaphragm plate 26 and on the other side on the floor of the service brake cylinder 2, ensures that the pressure rod 28 is retracted into the disengaged position when the service brake chamber 20 is ventilated.

The ventilation valve 16 is situated in the end of the piston rod 18 pointing away from the spring type brake piston 8 and, more precisely, is received in its interior chamber 32. An emergency release unit 34, which is not of further interest here, is also situated therein, but the interior chamber 32 of the piston rod 18 may communicate with the spring chamber 14.

The ventilation valve 16 contains a piston 38 (see FIG. 2, for example), working together with a valve seat 36, which is loaded by the pressure in the spring chamber 14 in the open position and which, in its position lifted off of the valve seat 36, releases a flow cross-section, as well as at least one further piston 42, working together with a further valve seat 40, which is loaded by the pressure in the spring chamber 14 in the open position and by the pressure in the service brake chamber 20 in the closed position and releases at least one further flow cross-section in its position lifted off of the further valve seat 40.

Figure 2:
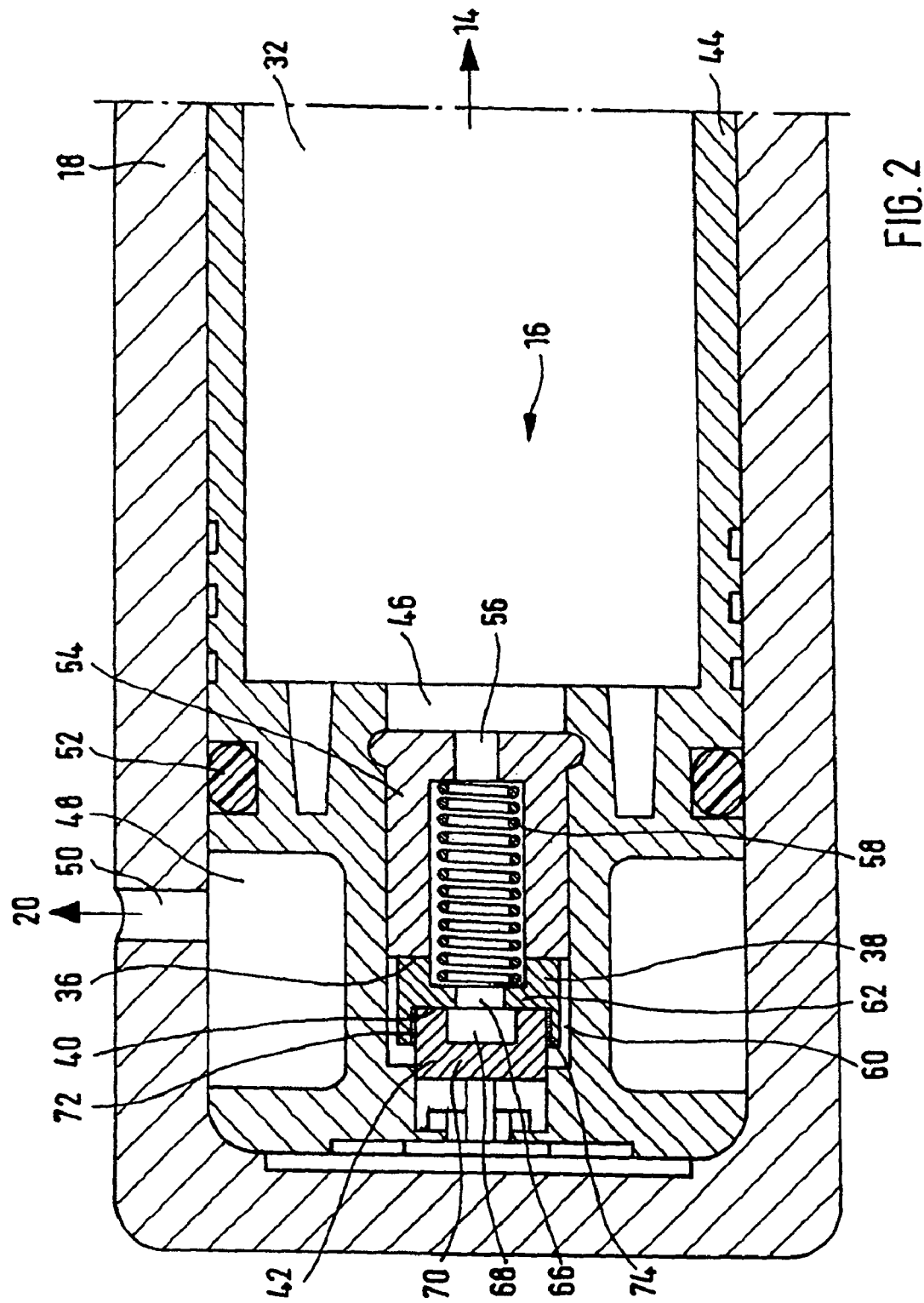
FIG. 2 shows a cross-sectional illustration of a ventilation valve of the combined service brake and spring type brake cylinder from FIG. 1 in the closed position.

This may be implemented, for example, by a ventilation valve 16 according to the object as shown in FIG. 2, which has a tubular valve housing 44, received in the piston rod 18, within which the two pistons 38, 42 are guided so they are axially movable. In addition, the valve housing 44 has a central through hole 46 and a ring chamber 48, which is connected thereto and is open radially outward, and which may be brought into flow connection with the service brake chamber 20 via radial holes 50 in the wall of the piston rod 18. The ring chamber 48 is sealed in relation to the piston rod 18 by an O-ring 52 received in a radial external peripheral groove.

A bushing-like valve body 54 is received on the end of the central through hole 46 of the valve housing 44 pointing toward the spring chamber 14, on whose front face facing away from the spring chamber 14 the valve seat 36 for the one piston 38 is implemented, against which the front face of this piston may hit and/or is movable away therefrom to close or open the one flow cross-section of the ventilation valve 16. The valve body 54 is implemented as cup-shaped, its floor provided with a central through hole pointing toward the spring chamber 14. The one piston 38 is pre-tensioned in the opening direction by a spring element 58, which is supported on the floor of the valve body 54. Furthermore, a ring gap 60 is implemented between the radial external peripheral surface of the one piston 38 and a radial internal peripheral surface of the central through hole 46 of the valve housing 44.

The one piston 38 has a T-shaped profile having a middle web 62, in which a central through hole 66 is implemented. The area of this middle web 62 minus the area of this hole 66 forms an active area for the pressure existing in the spring chamber 14. A pressure chamber 68 is at least partially delimited by the further piston 42, which is implemented as cup-shaped. An opening of this further piston 42 points toward the one piston 38, its end front face being able to strike against a piston face of the one piston 38, on which the further valve seat 40 is also implemented. The further piston 42 may thus carry along the one piston during a movement against the pressure existing in the spring chamber 14.

More precisely, the pressure chamber 68 is implemented between the middle web 62 of the one piston 38 and a floor 70 of the further piston 42, which may communicate on one side via the central through hole 66 of the one piston 38 and the central through hole 56 of the valve body 54 with the spring chamber 14. The area of this floor 70 then forms one active area for the pressure existing in the spring chamber 14. The other active area of the further piston 42 is loaded by the service brake pressure in the service brake chamber 20 and is formed by the back of the floor 70. The other piston 42 is preferably guided axially in the one piston 38 and on the central through hole 46 of the valve housing 44.

A flow cross-section in the form of a ring gap 72 is also implemented between the radial external peripheral face of the further piston 42 and the radial internal peripheral face of the one piston 38. Finally, a further ring gap 74 is also formed between a radial external peripheral face of the further piston 42 and the radial internal peripheral face of the through hole 46 of the valve housing 44, which represents a further flow cross-section of the ventilation valve 1.

The two pistons 38, 42 of the ventilation valve 16 are switchable as a function of the pressures existing on their active faces, i.e., against their assigned valve seat 36, 40 in the sealed position or away therefrom in the open position, the two pistons 38, 40 being pressure actuatable independently of one another. The situation in which both pistons 38, 40 are pressed against the valve seat 36, 40 assigned thereto and thus there is no flow connection between the spring chamber 14 and the service brake chamber 20 is shown in FIG. 2. This position results in particular when, to start on a rising roadway, the parking brake is still applied with ventilated spring type brake chamber 12 and the service brake is actuated using a brake demand which results in a service brake pressure and/or using a pressure gradient which exceeds a pressure threshold and/or a pressure gradient threshold. In this case, the force from the service brake pressure existing on the floor 70 of the further piston 42 is greater than the sum of the spring force and the force resulting from the pressure in the spring chamber 14, in particular because the pressure in the now maximally large spring chamber 14 is small.

Figure 3:
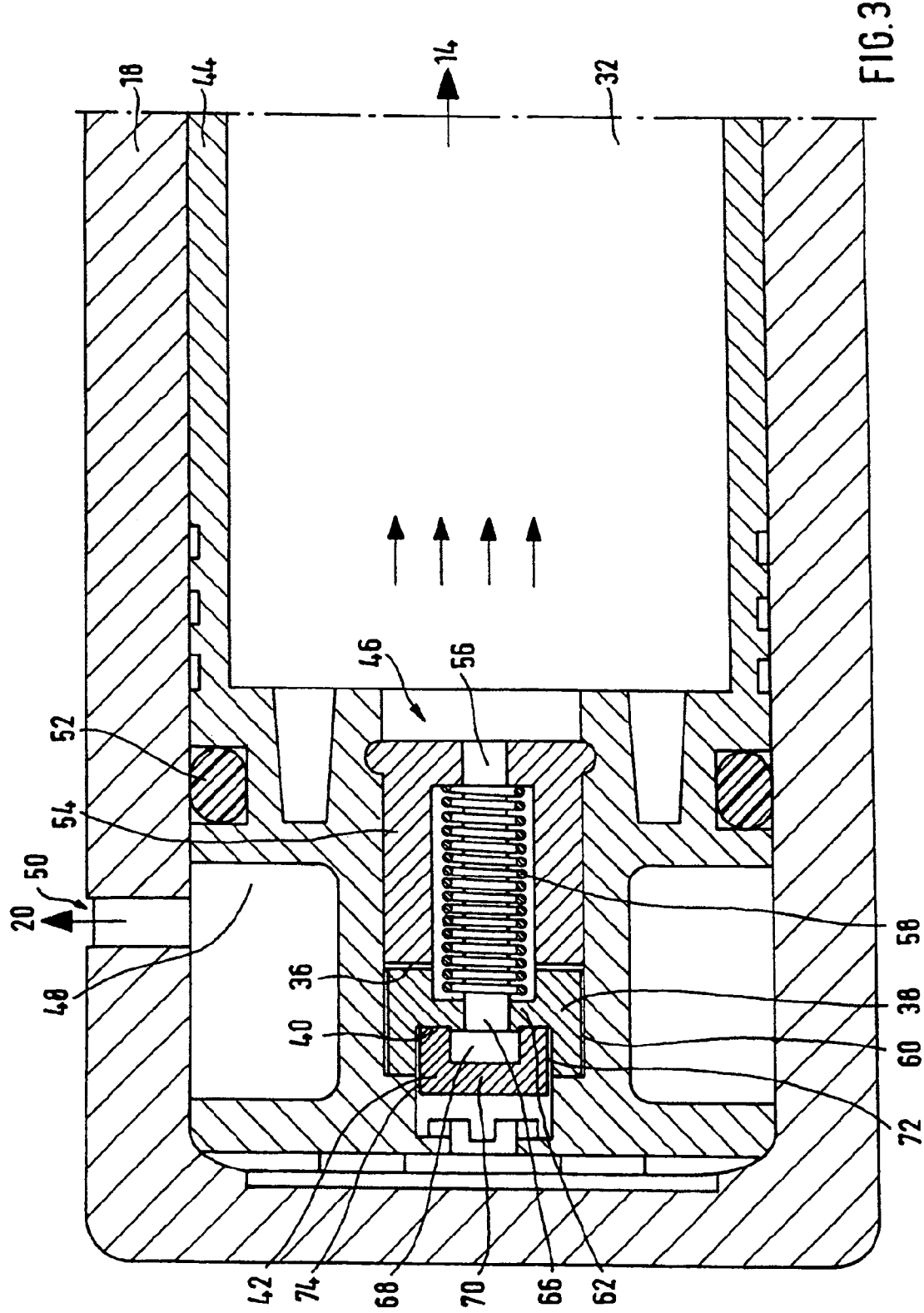
FIG. 3 shows a cross-sectional illustration of the ventilation valve from FIG. 2 in the partially open position.

If, however, in contrast thereto, in the course of starting on a hill, the service brake is actuated using a brake demand which results in a service brake pressure and/or using a pressure gradient which does not exceed the pressure threshold and/or the pressure gradient threshold, the force resulting from the service brake pressure and existing on the floor 70 of the further piston 42 is less than the sum of the spring force and the force resulting from the pressure in the spring chamber 14, so that the one piston 38 lifts off of its valve seat 36 and as a result releases the one flow cross-section, as shown in FIG. 3. In contrast, the further piston 42 still contacts its assigned valve seat 40 at the one piston 38 because of the service brake pressure acting thereon. Overall, an air volume does flow through the one flow cross-section from the service brake chamber 20 into the spring chamber 14, but this volume is comparatively small because of the further piston 42, which still forms a seal against its valve seat 40.

Figure 4:
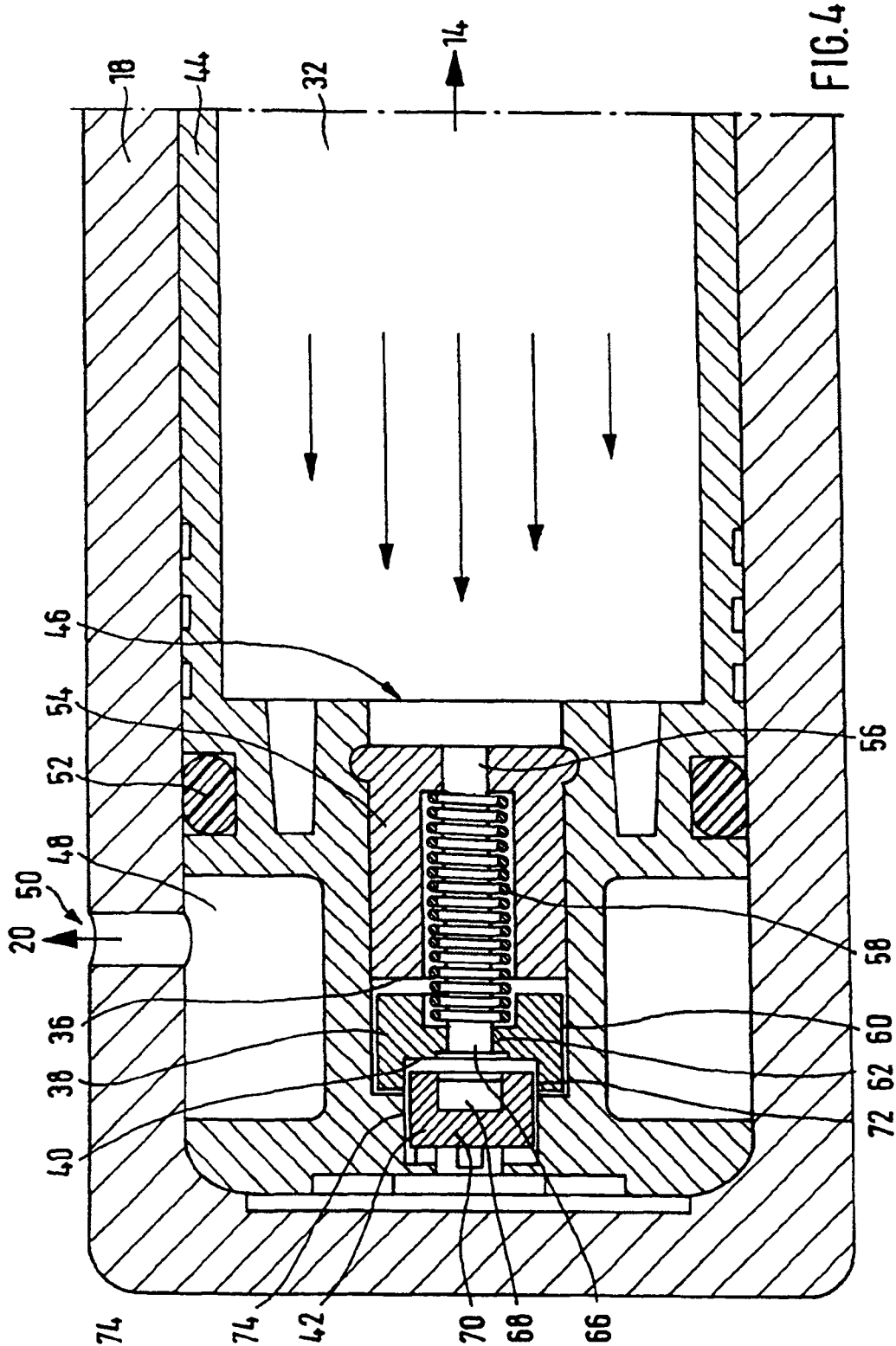
FIG. 4 shows a cross-sectional illustration of the ventilation valve from FIG. 2 in the completely open position.

FIG. 4 shows the situation in which both pistons 38, 42 are lifted off of their valve seats 36, 40 and as a result a flow cross-section between spring chamber 14 and service brake chamber 20 is maximal. This situation is provided when the parking brake is released with the service brake not actuated and as a result the spring type brake piston 8 is tensed with sudden reduction of the volume of the spring chamber 14 with simultaneous pressure increase by the storage spring 10. The pressure then acting on the active areas of the two pistons 38, 42 in the spring chamber 14 is so large in relation to the pressure in the ventilated service brake chamber 20 that both pistons 38, 42 are displaced into the open position.

A further embodiment of a ventilation valve 16 is shown in FIG. 5, in which a valve carrier 76, in which the valve body 54 and the two pistons 38, 42 are received, is inserted in the valve housing 44.

| Table of reference numerals |
|---|
| 1 service brake and spring type brake cylinder |
| 2 service brake cylinder |
| 4 spring type brake cylinder |
| 6 intermediate wall |
| 8 spring type brake piston |
| 10 storage spring |
| 12 spring type brake chamber |
| 14 spring chamber |
| 16 ventilation valve |
| 18 piston rod |
| 20 service brake chamber |
| 22 seal |
| 24 diaphragm |
| 26 diaphragm plate |
| 28 pressure rod |
| 30 return spring |
| 32 internal chamber |
| 34 emergency release unit |
| 36 valve seat |
| 38 piston |
| 40 valve seat |
| 42 piston |
| 44 valve housing |
| 46 through hole |
| 48 ring chamber |
| 50 hole |
| 52 O-ring |
| 54 valve body |
| 56 through hole |
| 58 spring element |
| 60 ring gap |
| 62 middle web |
| 66 through hole |
| 68 pressure chamber |
| 70 floor |
| 72 ring gap |
| 74 ring gap |
| 76 valve carrier |

The invention claimed is:

1. A combined service brake and spring type brake cylinder, comprising:
a) a diaphragm, which is situated in a housing of the service brake cylinder and may be impinged with pressure, and which delimits a service brake chamber, which may be impinged with a service brake pressure, on one side and a chamber receiving a return spring on the other side;
b) a spring type brake piston, which is situated in a housing of the spring type brake cylinder and is actuatable by a storage spring, which delimits a spring type brake chamber on one side and a spring chamber receiving a storage spring on the other side, and has a piston rod, which carries a ventilation valve, which produces or blocks a flow connection between the spring chamber and the service brake chamber;
c) wherein the ventilation valve contains a piston, working together with a valve seat, which is loaded by the pressure in the spring chamber in the open position and which releases a flow cross-section in its position lifted off of the valve seat;
d) wherein the ventilation valve contains at least one further piston, which works together with a further valve seat, and is loaded by the pressure in the spring chamber in the open position and by the pressure in the service brake chamber in the closed position, and which, in its position lifted off of the further valve seat, releases at least one further flow cross-section; and
e) wherein, with an applied parking brake and a simultaneously actuated service brake, having service brake pressures which are at least one of less than a pressure threshold and less than a pressure gradient threshold, the one piston is lifted off of the valve seat and the further piston forms a seal against the further valve seat.

2. The service brake and spring type brake cylinder according to claim 1, wherein the one piston is loaded in the opening direction by at least one spring element.

3. The service brake and spring type brake cylinder according to claim 2, wherein the one piston has a central through hole, which connects the spring chamber to a pressure side of the further piston, whose other pressure side is loaded by the service brake pressure.

4. The service brake and spring type brake cylinder according to claim 3, wherein the further piston is guided so it is axially movable on the one piston.

5. The service brake and spring type brake cylinder according to claim 4, wherein the further valve seat is implemented on the one piston.

6. The service brake and spring type brake cylinder according to claim 1, wherein the one piston has a central through hole, which connects the spring chamber to a pressure side of the further piston, whose other pressure side is loaded by the service brake pressure.

7. The service brake and spring type brake cylinder according to claim 6, wherein the further piston is guided so it is axially movable on the one piston.

8. The service brake and spring type brake cylinder according to claim 7, wherein the further valve seat is implemented on the one piston.

9. The service brake and spring type brake cylinder according to claim 1, wherein the valve seats are formed by axial faces, against which the pistons may hit axially.

10. The service brake and spring type brake cylinder according to claim 9, wherein the further valve seat is implemented on the one piston.

* * * * *